UNITED STATES PATENT OFFICE.

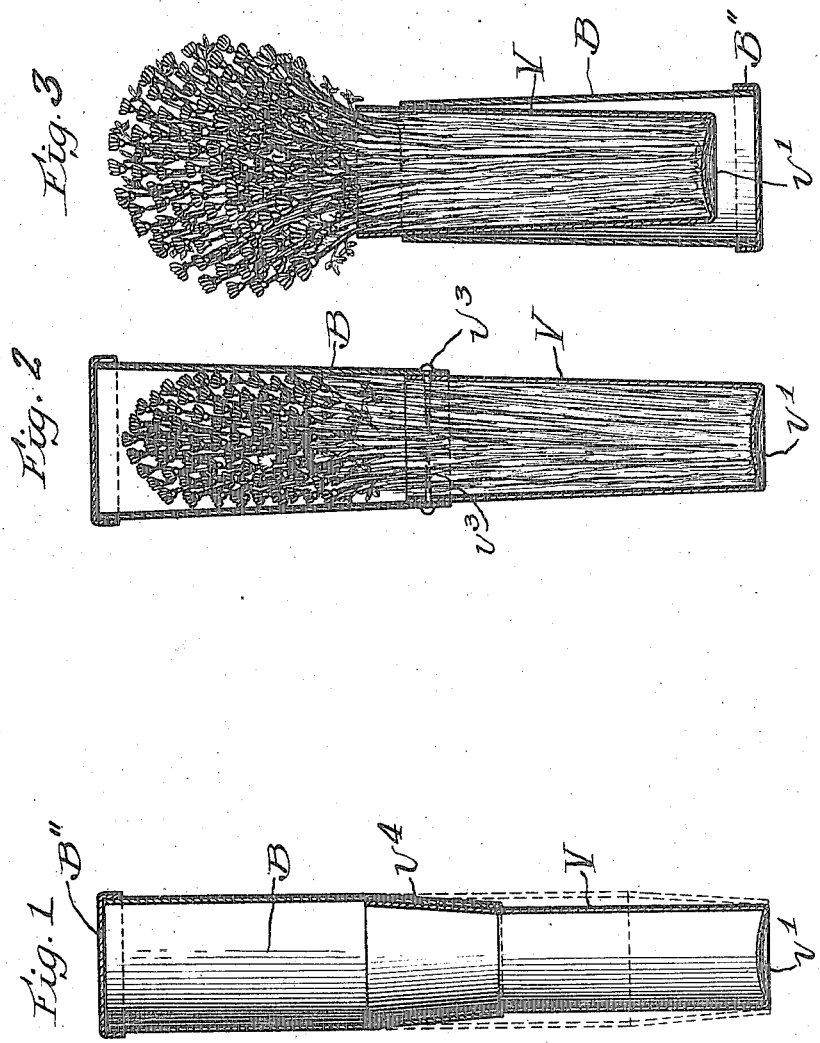

MAURICE RUBEL, OF CHICAGO, ILLINOIS.

COMBINED SHIPPING BOX OR CARTON AND VASE FOR NATURAL FLOWERS AND THE LIKE.

1,270,554.  Specification of Letters Patent.  Patented June 25, 1918.

Application filed June 9, 1915. Serial No. 33,084.

*To all whom it may concern:*

Be it known that I, MAURICE RUBEL, a citizen of the United States, residing in Chicago, in the county of Cook and State of Illinois, have invented a certain new and useful Combined Shipping Box or Carton and Vase for Natural Flowers and the like, of which the following is a specification.

Preliminarily it may be observed that the satisfactory shipment or delivery of cut flowers demands the observance of certain conditions, among which may be mentioned, the proper packing of the flowers to the end that they shall be saved from injury; compactness, in so far as this is compatible with the absence of such injury; and, of course security; to which it may be added that the present invention contemplates the highly desirable condition that when the parcel reaches its destination, it shall in and of itself embody and contain the equivalent of a vase, for holding and displaying the flowers after the manner of a vase such as is customarily used for that purpose. It may therefore be said, in general terms, that the invention contemplates a combined shipping carton and vase, the device of the invention, as a whole, comprising a box or carton appropriate for shipping or delivering the flowers and, as one of its component parts or elements a part that is adapted to serve as a vase for holding and displaying the flowers in customary manner. Naturally, this part which corresponds with and performs the functions of a vase must be water-tight. It receives the stems of the flowers which dip down into the water with which it is partially filled to a greater or less depth, when the flowers reach their destination and are ready to be displayed.

Now, I desire to have it understood that, regardless of the terminology or language which I may use in this application in describing or claiming my invention, I believe myself to be the first to provide or suggest a device, by whatever name it may be called, which will, at one and the same time serve as a carton, container or box for shipping or delivering flowers, through either long or short distances, and which has a part or section which, when the parcel reaches its destination, will serve as a vase for displaying the flowers, said vase-part or section being water-tight to the end, as before suggested, that it will contain water for preserving the flowers after the manner of an ordinary vase.

Hence, it may be said, in general terms, that the invention consists in the features of novelty that are herein described.

In the accompanying drawings which are hereby made a part of this specification, Figure 1 is an axial longitudinal section of a combined shipping box or carton and vase embodying the invention in a simple form.

Figs. 2 and 3 are similar views of a modification thereof, this being elected, for the purposes of this application, as the preferred form of the invention.

The paramount idea of the present invention is that it involves an article which combines in and of itself the elements or parts that are necessary in a box, container or carton for shipping or delivering flowers, through long or short distances and an element or part which upon the arrival of the parcel at its destination, is immediately available as a vase for displaying the flowers and that is water-tight to the end and for the purpose already described.

With this preliminary observation, and now referring to the drawing the letter, V, represents what has already been called or hinted at as the "vase section" of the device and the letter, B, represents what is herein called the "blossom section." These two sections are tubular and the bottom portion of the blossom section overlaps and surrounds the upper portion of the vase section, so that the two are in axial alinement.

The "vase-section", V, is water-tight to the end that it shall be capable of containing a sufficient quantity of water to preserve the flowers. This vase section, V, may be made with an integral bottom of inverted saucer-shape, as shown in the drawing or, if desired its lower end may be closed by a separate cap, in which latter case it is the intention that the cap shall have a water-tight fit. It will also be understood that the vase-section, V, may be made of any desired shape or material, but naturally, taking into consideration all of the requirements of the device, it will preferably be made of cylindrical shape and of paper or card-board stock treated in a manner that will render it waterproof. Manifestly the details of this need not be here gone into. It may be emphasized, however, that the present invention is not concerned with the material of which this vase-section is made, and while it is now contemplated to make it or some such material as above suggested, still it may be found to be desirable to make it of some other and more substantial material such, for example, as sheet metal or even earthenware, any of which materials would be within the scope of the invention.

So much for the vase-section, *per se*. It may or may not have special features or characteristics, but ordinarily it will, in order to prevent the blossom section, B, from moving away from the vase section, or from telescoping or slipping down over it to the damage and injury of the blossoms, it being understood, of course, that the blossoms are contained in and protected by the section, B. In order to provide against the telescoping of the sections, B, and V, to the injury of the blossoms, pins, $v^3$, or other fastening devices may be passed through the overlapping portions of the two sections, B and V.

The overlapping portions are tapered in such manner that they will go together with a wedge-like fit, after the manner of the sections of a telescope or a collapsible drinking cup, so that when distended with sufficient force to produce sufficient friction they will hold their places and this taper may extend through only a short distance as shown at $v^4$, in Fig. 1, or it may extend throughout the entire length of the sections, B and V, as shown in Figs. 2 and 3.

The upper end of the blossom section, B, is closed by a cap B″ for the purpose of practically excluding atmospheric air, or at any rate preventing its free circulation into and out of the carton, as this would naturally hasten the deterioration of the flowers.

The cap B″ is removable after the manner of a slip cover. In the form shown in Fig. 1, in order to display the blossoms above the top of the vase-section, V, the blossom section, B, must be slipped down over the vase section and either completely removed or brought to the position indicated by dotted lines in said figure. In either event, the cap B″ must be removed else it will come in contact with and crush the blossoms.

So with the form shown in Figs. 2 and 3. With this form, when the parcel reaches its destination, the cap B″, is first removed, the blossom-section is then slipped down over the vase-section and completely removed therefrom. It is then inverted and slipped upward over the vase-section as shown in Fig. 3. By reason of the fact that the bottom of the blossom-section is of less diameter than the top of the vase-section, when the blossom-section is thus slipped upward over the vase-section, the vase-section will project upward beyond the bottom of the then inverted blossom-section as shown in Fig. 3. This will increase the height and also give an enlarged base or foot to the vase thus made up. If desired the cap, B″, may be slipped onto this enlarged base, as shown in Fig. 3.

The device of the present application should not be confounded with an ordinary box having an ordinary slip cover. While they remotely resemble each other, still they differ in at least this one important particular, namely that in the device of the present application the blossom section projects a considerable distance above the top of the vase section so as to provide ample space for the accommodation of the blossoms, leaving them exposed above the top of the vase section when the blossom section is removed.

What I claim as new is:

1. A combined shipping carton and vase for flowers, having a water-tight vase section and a removable blossom section, the bottom portion of the blossom section overlapping and surrounding the upper portion of the vase section, whence the blossom section extends upward above the top of the vase section far enough to inclose the blossoms of the bouquet, and whereby when said blossom section is removed the blossoms are left projecting from and exposed above the top of the vase section, the overlapping portions of said sections being flared or tapered so as to prevent the blossom section from moving upward away from the vase section.

2. A combined shipping carton and vase for flowers having a water-tight tubular vase-section adapted to receive the stems of a bouquet, a tubular blossom section the bottom portion of which has removable engagement with the top portion of the vase section, whence the blossom section extends upward above the top of the vase-section far enough to inclose the blossoms of a bouquet, a removable cap for closing the upper end of the blossom-section, and means for normally preventing the longitudinal movement of said tubular sections relatively to each other, the overlapping portions of said tubular sections being flared or tapered.

3. A combined shipping carton and vase for flowers, having, in combination, a water-tight vase-section adapted to receive the stems of the flowers, and a section for covering the blossoms of the flowers, the bottom portion of the blossom section and the upper portion of the vase-section overlapping each other and being tapered, complementarily, and means for normally preventing the unintentional longitudinal movement of said sections relatively to each other.

4. A combined shipping carton and vase, having, in combination, a blossom section and a watertight vase-section, said sections being tubular and the blossom section overlapping and surrounding the upper portion of the vase section, said overlapping portions being tapered downward, and the blossom-section being of larger diameter than the vase section, whereby the blossom section may be slipped down so as to surround the vase section for the insertion of the stems and slipped upward when the blossoms are to be confined.

MAURICE RUBEL.

Witnesses:
DONHEA THOMPSON,
MABEL V. FOWLER.

Copies of this patent may be obtained for five cents each, by addressing the "Commissioner of Patents, Washington, D. C."